Patented Sept. 5, 1922.

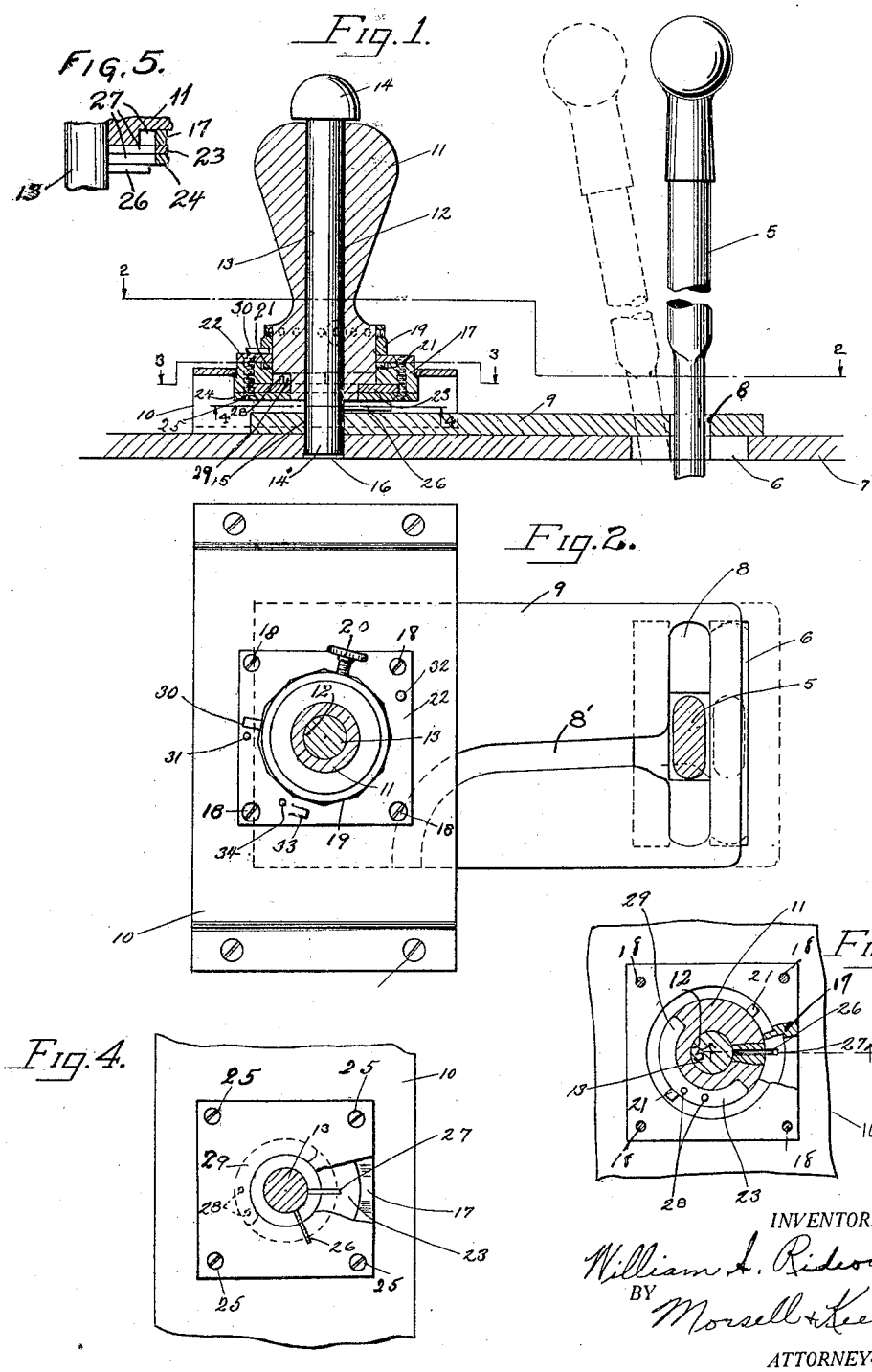

1,427,912

UNITED STATES PATENT OFFICE.

WILLIAM A. RIDEOUT, OF OSHKOSH, WISCONSIN.

AUTOMOBILE LOCK.

Application filed August 16, 1919. Serial No. 317,921.

*To all whom it may concern:*

Be it known that I, WILLIAM A. RIDEOUT, a citizen of the United States, and resident of Oshkosh, in the county of Winnebago and State of Wisconsin, have invented new and useful Improvements in Automobile Locks, of which the following is a description, reference being had to the accompanying drawings, which are a part of this specification.

The present invention relates to certain new and useful improvements in locks and refers more particularly to a device of this character especially adapted for use in connection with automobiles to prevent the unauthorized use thereof.

One object of the present invention is to provide lock means engageable with the usual gear shift lever which may be readily operated to lock the lever in neutral position or to permit the free and easy movement of the lever to its various positions.

Another object of this invention is to provide a gear shift lever engaging plate having a slot therein through which the gear shift lever passes, the plate being readily movable laterally to permit the movement of the gear shift lever to its various operating positions and having means for locking the plate against lateral movement whereby the gear shift lever will be locked in neutral position.

A further object of the present invention is to provide a combination lock for the purpose and of the class described which will have means whereby the same may be readily operated in the dark to unlock the same.

A still further object of the present invention is to provide a lock for the purpose and of the class described which will not in any manner disfigure the automobile upon which it is used, and which will be simple and compact in construction and efficient in operation.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawing I have illustrated one complete example of the physical embodiment of my invention constructed according to the best mode I have so far devised for the practical application of the principles thereof, and in which:

Fig. 1 is a sectional view taken longitudinally through a gear shift lever locking device constructed according to and embodying the various features of my invention.

Fig. 2 is a top plan view thereof, the tumbler operating knob and the gear shift lever being in cross section, said view being taken on the line 2—2 of Figure 1.

Fig. 3 is a sectional view taken through the lock proper, on the line 3—3 of Figure 1.

Fig. 4 is a view looking at the bottom of the lock proper, parts being broken away and in section, and said view being taken on the line 4—4 of Figure 1, and Fig. 5 is a sectional view taken on the line 5—5 of Fig. 4.

Referring now more particularly to the accompanying drawing in which like numerals designate like parts throughout the several views, the usual gear shift lever 5 which is normally operable from its neutral position as depicted in full lines in Figures 1 and 2 to various operative positions in the H slot 6 formed in the floor 7 of the vehicle, not shown, is passed through an elongated opening or slot 8 formed in a lock plate 9.

The plate 9 has its end, opposite the slot 8, slidably mounted beneath a base 10 so that the lever when moved in the transverse portion of the H slot 6 will carry the plate 9 with it to permit its free movement to and from the various "speeds," and I provide means carried by the base 10 for locking the plate 9 against movement so that the lever 5 will be held in its neutral position as best shown in Figures 1 and 2. The plate 9 has a curved slot 8' leading from the slot 8 to its portion normally positioned under the base 10 to permit the ready disengagement from the lever 5 of the plate only after the base 10 has been removed.

The means for locking the plate 9 against movement include a tumbler operating knob or handle 11 having a central bore 12 in which is disposed the shank 13 of the locking key having an operating handle 14 formed thereon and disposed exteriorly of the knob 11 and has its lower end 14' adapted to be engaged in a recess 15 in the adjacent end of the plate 9. The key 13 when engaged in the opening 15 of the plate 9 and a corresponding opening 16 in the floor 7 securely holds the plate 9 against movement as will be apparent, see Fig. 1.

The tumbler operating knob 11 is rotatably mounted in a bed block 17 secured to the base 10 by suitable fastening means 18, and the handle 11 is held therein against removal by means of a collar member 19 secured thereto by a binding screw 20 and projections 21 engaged in a recess in the bed block 17 and held therein by means of a plate cover 22 secured thereto by fastenings 18. The bed block 17 has its under face counterbored to receive a tumbler disk or plate 23 which is held therein by means of a cover plate 24 secured by fastening screws 25.

As best shown in Figures 1, 3 and 4, the key member 13 has carried thereby near its end 14' a key projection 26 and the inner end of the handle 11, cover 24, the tumbler disk 23 and the bed block 17 have slots 27 therein adapted to be alined by a manipulation of the handle 11 to permit the key 26 to be passed upwardly therethrough to position the end 14' outwardly of the opening 15 and allow the free and easy sliding movement of the plate 9. The means for alining the slots 27 by operation of the handle 11 include a pair of spaced apart upwardly projecting studs 28 formed on the inner face of the tumbler disk 23 and projecting upwardly into a curved channel or recess 29 formed in the adjacent portion of the lower end of handle 11 so that the rotation of the handle 11 will engage the ends of the slot 29 with the adjacent projection 28 and move the tumbler 23.

To aline the slots 27 the handle 11 is rotated in a clockwise direction, with reference to Figures 2 and 3, until a pivoted pawl 30 carried by the collar 19 abuts a pin 31 carried by the plate 22, this movement engaging one of the pins 28 with the adjacent end of the slot 29 at the left with reference to Figure 1, and rotating the tumbler 23 in a clockwise direction to bring the slot 27 thereof to a position spaced from the slot of the plate 24. The handle 11 is then rotated in a counter-clockwise direction until the pawl 30 engages a stop pin 32 when the slot of the tumbler disk 23 will be just beyond the slot of the handle 11, then the tumbler is again rotated in a clockwise direction until the pawl 30 strikes a cam projection 33, the pawl is then raised and allowed to pass over stop 33 and engage a stop pin 34. The movement from stop 33 to stop 34 rotates the tumbler disk in a clockwise direction a distance equal to the distance to which the slot thereof has been moved beyond the slot of the handle 11, and thus alines the slot of disk 23 with the slot in the handle 11. The handle 11 is then rotated in a counter-clockwise direction until the pawl drops over the cam stop 33 when all of the slots 27 will be alined and the pin may then be turned until the key 26 engaged therein may be moved therein to free the plate 9.

The collar 19 has thereon a number of designations adapted to correspond with designations on the handle 11 so that the owner of an automobile may unscrew the member 20 and move the collar so that some other number will be alined therewith and thus destroy the combination of the lock, and only a person knowing which numbers to aline will be able to unlock the same.

From the foregoing description taken in connection with the accompanying drawing, it will be readily apparent that by means of the stops 31, 32, 33 and 34, the lock may be readily opened in the dark without the aid of a light and thus make it especially desirable in that the inconvenience of making a light is dispensed with when manipulating the same.

What I claim as my invention is:

1. An automobile gear shift lever lock of the class described comprising a gear shift lever engaging plate having a slot to receive the gear shift lever, a stationary member adapted to slidably receive said plate, a vertically disposed locking pin slidably mounted in said member above said plate, said member having a recess to receive the lower end of said pin, said plate having an aperture for said pin which is brought into register therewith when the gear shift lever is in its inoperative position, and locking means associated with said pin for the purpose described.

2. An automobile gear shift lever lock of the class described comprising a gear shift lever engaging plate having a slot to receive the gear shift lever, a stationary member adapted to slidably receive said plate, a vertically disposed locking pin slidably mounted in said member above said plate, said member having a recess to receive the lower end of said pin, said plate having an aperture for said pin which is brought into register therewith when the gear shift lever is in its inoperative position, and locking means associated with said pin adapted to secure the pin in operative engagement with said plate, said locking means being adapted to hold said pin out of engagement with said plate during normal operation of the gear shift lever.

3. An automobile gear shift lever lock of the class described comprising a plate having a transverse slot near one end and a curved slot communicating therewith to permit the engagement in said transverse slot of a gear shift lever, means engaging the other end of said plate to releasably lock the same against movement.

In testimony whereof, I affix my signature.

WILLIAM A. RIDEOUT.